US009467816B2

United States Patent
Mitchell, Jr.

(10) Patent No.: US 9,467,816 B2
(45) Date of Patent: Oct. 11, 2016

(54) LOCATION AWARE CONTENT USING PRESENCE INFORMATION DATA FORMATION WITH LOCATION OBJECT (PIDF-LO)

(71) Applicant: TeleCommunication Systems, Inc., Annapolis, MD (US)

(72) Inventor: Donald Mitchell, Jr., Bellevue, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/748,357

(22) Filed: Jun. 24, 2015

(65) Prior Publication Data
US 2015/0350852 A1    Dec. 3, 2015

Related U.S. Application Data

(63) Continuation of application No. 13/476,846, filed on May 21, 2012, now Pat. No. 9,087,132, which is a continuation of application No. 11/640,860, filed on Dec. 19, 2006, now Pat. No. 8,185,567.

(60) Provisional application No. 60/766,227, filed on Jan. 2, 2006.

(51) Int. Cl.
*G06F 17/30* (2006.01)
*H04W 4/04* (2009.01)

(52) U.S. Cl.
CPC ............ *H04W 4/04* (2013.01); *G06F 17/3087* (2013.01); *G06F 17/30241* (2013.01)

(58) Field of Classification Search
CPC .................. G06F 17/30386; G06F 17/3087; G06F 17/30241; G06F 17/30902
See application file for complete search history.

(56) References Cited

U.S. PATENT DOCUMENTS

| | | | | |
|---|---|---|---|---|
| 7,627,331 | B2 * | 12/2009 | Winterbottom | H04W 8/16 455/456.1 |
| 7,895,263 | B1 * | 2/2011 | Kirchmeier | G06Q 10/06 379/37 |
| 2002/0099802 | A1 * | 7/2002 | Marsh | G09B 5/00 709/220 |
| 2003/0013444 | A1 | 1/2003 | Watanabe et al. | |
| 2003/0186709 | A1 * | 10/2003 | Rhodes | H04L 12/5895 455/456.1 |
| 2003/0222901 | A1 * | 12/2003 | Houck | G06F 17/30861 715/738 |

(Continued)

*Primary Examiner* — Scott A Waldron
*Assistant Examiner* — Fatima Mina
(74) *Attorney, Agent, or Firm* — Tarolli, Sundheim, Covell & Tummino LLP

(57) ABSTRACT

The format of the Presence Information Data Format-Location Object (PIDF-LO) as defined by the Internet Engineering Task Force (IETF) is extended or modified to accommodate, within the standard PIDF-LO format, an association of geospacial location to XML content on the Internet. A geospacial location is associated with Extensible Markup Language (XML) content on the Internet. The XML content is identified by a universal resource locator (URL), and associated with geospatial location information (either a specific location, zone, or direction). The URL is inserted into a <presence . . . > section of a Presence Information Data Format-Location Object (PIDF-LO) compliant document as defined by the Internet Engineering Task Force (IETF). In this way, geospacial location information is associated with Internet based XML content using a standard PIDF-LO format.

23 Claims, 8 Drawing Sheets

(56) References Cited

U.S. PATENT DOCUMENTS

| | | | |
|---|---|---|---|
| 2004/0064334 A1* | 4/2004 | Nye | G06F 17/30241 705/317 |
| 2005/0031095 A1* | 2/2005 | Pietrowicz | H04M 3/46 379/88.18 |
| 2005/0213537 A1* | 9/2005 | Ingimundarson | H04L 12/581 370/329 |
| 2005/0257240 A1* | 11/2005 | Faulkner | G06F 17/30817 725/92 |
| 2007/0027997 A1* | 2/2007 | Polk | H04L 61/2015 709/230 |
| 2007/0033089 A1* | 2/2007 | Dharmarajan | G06F 17/30241 705/7.29 |
| 2007/0093217 A1* | 4/2007 | Maeda | H03C 3/0925 455/110 |
| 2007/0112777 A1* | 5/2007 | Field | G06F 17/3087 |

* cited by examiner

*FIG. 4A*

Modified Presence Information Data Format – Location Object for use with MIME content

```
<?xml version="1.0" encoding="UTF-8"?>
    <presence xmlns="urn : ietf : params : xml : ns : pidf"
        xmlns : gp="urn : ietf : params : xml : ns : pidf : geopriv10"
        xmlns : gml="urn : opengis : specification : gml : schema-xsd : feature : v3.0"
        xmlns : cl="urn : ietf : params : xml : ns : pidf : geopriv10 : civilLoc"
        entity ="pres:http://otiswyres.com/images/SunfromPlane.png"
        name="weather:hurricane season, century : 1800, season : fall, year : 1842"
        src=http://otiswyres.com/images/SunfromPlane.png">
            <tuple id="sg89ab">
            <status>
                <gp : geopriv>
                    <gp : location-info>
                     <gml : position>
                        <gml : Point gml : id="point96" srsName = "http://www.opengis.net/gml/srs/
epsg.xml#4326">
                            <gml : pos>31 : 56 : 00S 115 : 50 : 00E</gml : pos>
                        <gml : Point>
                     </gml : position>
                    </gp : location-info>
                </gp : geopriv>
            </status>
            <timestamp>2003-06-22T20 : 57 : 29Z</ timestamp>
        </tuple>
            <tuple id="sg89ae">
                <status>
                    <gp : geopriv>
                        <gp : location-info>
```

— — — — — — CONTINUED ON SHEET 5/8 — — — — — —

*FIG. 4B*

⌐ — — — — — — CONTINUED FROM SHEET 4/8 — — — — — — ┐

```
            <cl : civilAddress>
                <cl : country>US</cl : country>
                <cl : A1>Florida</cl : A1>
            <cl : A3>Miami</cl : A3>
            <cl : A6>Ocean Blvd</cl : A6>
            <cl : HNO>123</cl : HNO>
            <cl : LOC>Suite 42</cl : LOC>
            <cl : PC>55527-0401</cl : PC>
            </cl : civilAddress>
                </gp : location-info>
            </gp : geopriv>
        </status>
        <timestamp>2003-06-22T20 : 57 : 29Z</ timestamp>
        </tuple>
    <Timeperiod>
    <begin>
        <TimeInstant>
        <timeposition>1876-08-01</ timePosition>
        </TimeInstant>
    </begin>
    <end>
        <TimeInstant>
            <timePosition>1876-08-02</ timePosition>
        </TimeInstant>
        </end>
    </TimePeriod>
</presence>
```

FIG. 5

Sample of one implementation for Location Aware Content –
Modified Presence Information Data Format – Location Object (PIDF-LO)

```
<presence entity=&tiimg src "http://otiswyres.com/images/SunfromPlane.png" name="Sun from Plane">
    <note xml:lang="en">tag:weather="hurricane" tag:century="1800" tag:season="fall" tag:year="1842" </note>
    <tuple id="12345">
    <status>
        <geopriv>
            <location-info>
                <gml:location>
                    <gml:Point gml:id="point96" srsName="http://www.opengis.net/gml/srs/epsg.xml#4326">
                        <gml:coordinates>31:56:00S 115:50:00E</gml:coordinates>
                    </gml:Point>
                </gml:location>
            </gp:location-info>
                <cl:civilAddress>
                    <cl:country>US</cl:country>
                    <cl:A1>Florida</cl:A1>
                    <cl:A3>Miami</cl:A3>
                    <cl:A6>Ocean Blvd</cl:A6>
                    <cl:HNO>123</cl:HNO>
                    <cl:LOC>Suite 42</cl:LOC>
                    <cl:PC>55527-0401</cl:PC>
                </cl:civilAddress>
            </gp:location-info>
            </location-info>
        </geopriv>
    </status>
    </tuple>
</presence>
<TimePeriod>
    <begin>
        <TimeInstant>
            <timePosition>1876-08-01</timePosition>
        </TimeInstant>
    </begin>
    <end>
        <TimeInstant>
            <timePosition>1876-08-02</timePosition>
        </TimeInstant>
    </end>
</TimePeriod>
```

FIG. 7
(PRIOR ART)

```
<?xml version="1.0" encoding="UTF-8"?>
<presence xmlns="urn : ietf : params : xml : ns : pidf"
    xmlns : gp="urn : ietf : params : xml : ns : pidf : geopriv10"
    xmlns : cl ="urn : ietf : params : xml : ns : pidf : geopriv10 : civicAddr"
    xmlns : gs="urn : ietf : params : xml : ns : pidf : geopriv10 : geoShape"
    entity ="pres : mike@seattle.example.com">
    <tuple id="sg89ab">
      <status>
         <gp : geopriv>
            <gp : location-info>
               <Polygon srsName="urn : ogc : def : crs : EPSG : : 4326"
                        xmlns="http://www.opengis.net/gml">
                  <exterior>
                     <LinearRing>
                        <pos>37.775 -122.4194</pos>
                        <pos>37.555 -122.4194</pos>
                        <pos>37.555 -122.4264</pos>
                        <pos>37.775 -122.4264</pos>
                        <pos>37.775 -122.4194</pos>
                     </LinearRing>
                  </exterior>
               </Polygon>
               <cl : civicAddress>
                  <cl : FLR>2</cl : FLR>
               </cl : civicAddress>
            </gp : location - info>
            <gp : usage - rules/>
         </gp : geopriv>
      </status>
      <timestamp>2003-06-22T20 : 57 : 29Z</timestamp>
   </tuple>
</presence>
```

LOCATION AWARE CONTENT USING PRESENCE INFORMATION DATA FORMATION WITH LOCATION OBJECT (PIDF-LO)

The present application is a continuation of U.S. application Ser. No. 13/476,846, filed on May 21, 2012, entitled "Location Aware Content Using Presence Information Data Formation with Location Object (PIDF-LO)"; which is a continuation of U.S. patent application Ser. No. 11/640,860, filed on Dec. 19, 2006, entitled "Location Aware Content Using Presence Information Data Formation with Location Object (PIDF-LO)", now U.S. Pat. No. 8,185,567; which claims priority from U.S. Provisional Application No. 60/766,227, entitled "Location Aware Content", to Donald Le Roy Mitchell, Jr., filed Jan. 2, 2006, the entirety of all three of which are expressly incorporated herein by reference.

BACKGROUND OF THE INVENTION

1. Field of the Invention

This invention relates generally to wireless and long distance carriers, Internet Service Providers (ISPs), and information content delivery services/providers and long distance carriers. More particularly, it relates to location services for the wireless industry.

2. Background of Related Art

Location information regarding subscribers is becoming increasingly available in a wireless network. Location information relates to absolute coordinates of a wireless device.

FIG. 6 shows a conventional LoCation Services (LCS) request.

In particular, as shown in FIG. 6, a location server 106 requests location information regarding a particular mobile subscriber (MS) from a core network node, e.g., from a Mobile Switch Center (MSC) 110. Requested information regarding a particular wireless device (MS) may include, e.g., attach, detach, and location area update. The location server 106 may also request information regarding the wireless device such as attach, detach and/or location area update from a Packet Data Node (e.g., SGSN, GGSN, or PDSN), or help the device calculate x/y direction. Typically, location information regarding a particular wireless device is requested of a home location register (HLR).

As shown in step 1 of FIG. 6, a locations services client 104 sends a message to a location server 106.

In step 2, the location server 106 sends a Provide Subscriber Info message to a Home Location Register 108, requesting subscriber information regarding a particular subscriber.

In step 3, the carrier's Home Location Register (HLR) 108 provides the subscriber information for the requested subscriber back to the location server 106.

In step 4, location information regarding the requested subscriber is requested to either an MSC or Packet Data node 110. The MSC or Packet Data Node preferably provides precise location information using, e.g., a global positioning satellite (GPS), triangulation techniques, or other relevant locating technology, or helps the device calculate X/Y direction.

In step 5, the location request is forwarded to the Radio Access Network (RAN) 112 if needed.

In step 6, precise, updated location information regarding the requested subscriber is sent to the location server (LS) 106.

In step 7, an ultimate response to the original location request is sent to the LCS client 104 that initially requested the location information.

Secure User Plane for Location (SUPL) is a standards-based protocol that has been developed to allow a mobile handset client to communicate with a location server, e.g., as shown in step 1 of FIG. 6. The SUPL specification is defined by the Open Mobile Alliance (OMA) standards working group. Refer to OMA Secure User Plane Location Architecture document, OMA-AD-SUPL-V1_0-20060127-C for more details on OMA SUPL call flows; and OMA User Plane Location Protocol document, OMA-TS-ULP-V1_0-20060127-C. The OMA SUPL Version 1 specifies two basic types call flows: (1) a SUPL network initiated (NI) call flow, and (2) a SUPL set initiated (SI) call flow. According to the SUPL standard, a session ID has a unique value consisting of server and handset portions.

The conventional Presence Information Data Format-Location Object (. PIDF-LO) was developed by the GEOPRIV working group, and is the Internet Engineering Task Force (IETF) recommended way to encode location information. Location information in PIDF-LO format may be implemented in a variety of ways, including in presence based systems, and in the context of emergency services and other location based routing applications.

The PIDF-LO format provides for an unbounded number of tuples. (A "tuple" generally relates to a group of anonymous data values traveling together. The word is a generalization of the sequence: couple, triple, quadruple, quintuple, sextuple, etc.) The geopriv element resides inside the status component of a tuple, hence a single PIDF document may contain an arbitrary number of location objects, some or all of which may be contradictory or complementary. The actual location information is contained inside a <location-info> element, and there may be one or more actual locations described inside the <location-info> element.

Generally speaking, the structure of a PIDF-LO can be depicted as follows:

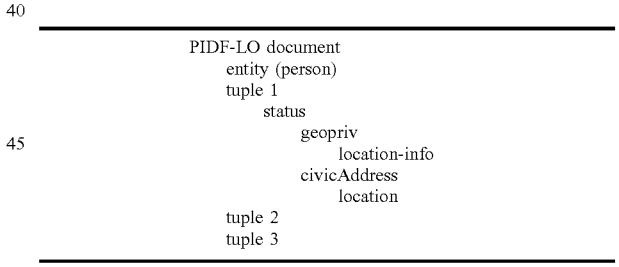

The conventional PIDF-LO format provides information relating to location, time and status to individuals and entities. The PIDF-LO structure is intended for use with standardized Internet protocols, including Internet protocol (IP), Session Initiation Protocol (SIP), and Simple Object Access Protocol (SOAP).

For multi-media communications using Session Initiation Protocol (SIP), the location of a caller can be indicated in PIDF-LO format. SIP is an Internet Engineering Task Force (IETF) standard protocol for initiating an interactive user session that involves multimedia elements such as video, voice, chat, gaming, virtual reality, etc. SIP is specified in IETF Request for Comments (RFC) 3261 (replacing 2543). Like HTTP or SMTP, SIP works in the application layer of the open systems interconnection (OSI) communications model. SIP can also be used to invite participants to sessions that do not necessarily involve the initiator. Because SIP supports name mapping and redirection services, it makes it possible for users to initiate and receive communications and services from any location, and for networks to identify the users wherever they are. SIP is a request-response protocol dealing with requests from clients and responses from servers. Participants are identified by SIP universal resource locators (URLs). Requests can be sent through any transport protocol, such as UDP, SCTP, or TCP. SIP determines the end system to be used for the session, the communication media and media partners, and the called party's desire to engage in the communication. Once these are assured, SIP establishes call parameters at either end of the communication, and handles call transfer and termination.

FIG. 7 shows a conventional Presence Information Data Format-Location Object (PDIF-LO) format document, as defined by the Internet Engineering Task Force (IETF).

In particular, FIG. 7 shows an example of civic and geospatial location information use in conventional PIDF-LO format document. In the given example, an entity named Mike is visiting his Seattle office and connects his laptop into an Ethernet port in a spare cube. In this case the location is a geodetic location, with the altitude represented as a building floor number. The main location of user is inside the rectangle bounded by the geodetic coordinates specified. Further that the user is on the second floor of the building located at these coordinates.

Of particular note in FIG. 7 is that the entity list is conventionally used to identify a physical entity:
    entity="pres:mike@seattle.example.com"
Generally speaking, conventional PIDF-LO presence lists are used to identify a person. An example person entity=Don@telecomsys.com and a corresponding example name=is "Don Mitchell".

SUMMARY OF THE INVENTION

A method and apparatus for tying a geospacial location to Extensible Markup Language (XML) content on a network comprises identifying a universal resource locator (URL) of XML content to be tagged with geospacial location information. The URL is inserted into a <presence . . . > section of a Presence Information Data Format-Location Object (PIDF-LO) compliant document as defined by the Internet Engineering Task Force (IETF). Geospacial location information is associated with the XML content.

BRIEF DESCRIPTION OF THE DRAWINGS

Features and advantages of the present invention will become apparent to those skilled in the art from the following description with reference to the drawings, in which:

FIGS. 4A-B show exemplary presence lists for a Modified Presence Information Data Format-Location Object (Modified PIDF-LO) document for use in tying MIME type logical content to a geospacial location, and for tagging the content with descriptive information relating to the content, in accordance with the principles of the present invention.

FIG. 5 shows exemplary presence lists for a location aware content-Modified Presence Information Data Format-Location Object (Modified PIDF-LO) for use in tying MIME type logical content to a geospacial location, and for tagging the content with descriptive information relating to the content, in accordance with the principles of the present invention.

FIG. 7 shows a conventional Presence Information Data Format-Location Object (PDIF-LO) format document, as defined by the Internet Engineering Task Force (IETF).

DETAILED DESCRIPTION OF ILLUSTRATIVE EMBODIMENTS

Figure 1:
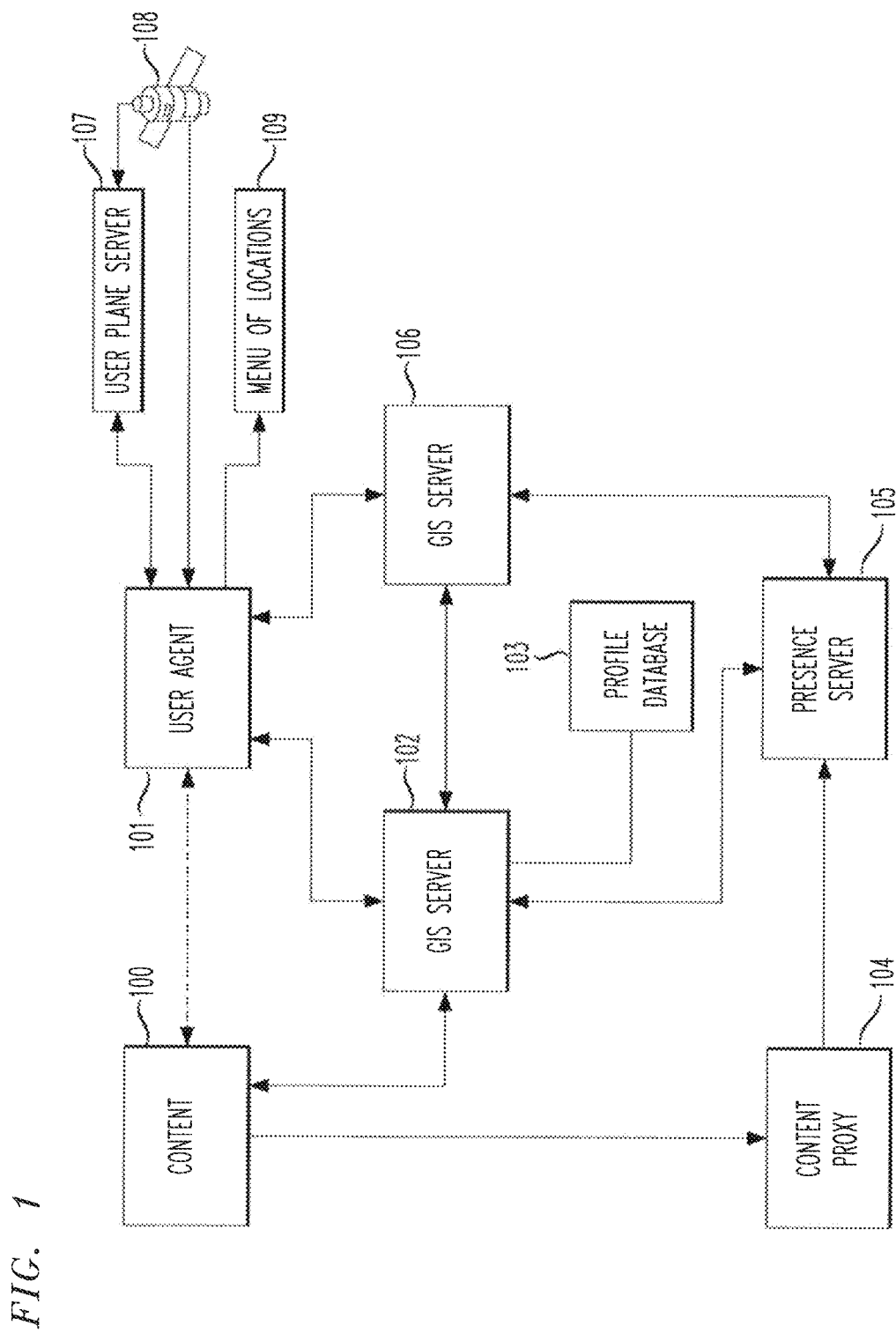
FIG. 1 shows relevant elements associating MIME type content on the Internet to a geographic location while also correlating other descriptive indexing terms within a modified standards based Extensible Markup Language (XML) based PIDF-LO structure as defined by the Internet Engineering Task Force (IETF), for use with standardized Internet protocols such as IP, SIP and SOAP, in accordance with the principles of the present invention.

The present invention extends and modifies the otherwise conventional format of the Presence Information Data Format-Location Object (PIDF-LO) format as defined by the Internet Engineering Task Force (IETF). Conventional PIDF-LO document format tags actual people or places with a geospacial location. The otherwise conventional PIDF-LO format is extended or modified to associate a geospacial location to XML content data on a computer network such as the Internet, corporate Intranets, and/or corporate Extranets.

In particular, content on a computer based network (e.g., Multimedia Internet Message Extensions (MIME) type content) is associated with a geographic location. Thus, instead of associating with a person, the invention associates location with content, e.g., Internet XML content.

In accordance with the disclosed embodiments, content is referenced using a modification to the otherwise conventional PIDF-LO format as follows. A location is associated with Internet based XML reference content using a modified PIDF-LO format using the otherwise conventional <presence . . . > section lists elements. Elements used include the "entity", "src" and/or "name" fields are modified to associate a location with Internet based XML content.

As an example, the "entity=" element of the PIDF-LO format may be referenced as, e.g., entity="pres:http://ow.com/S.png".

Similarly, the "name=" element may be referenced as, e.g., name="weather:hurricane season, century:1800, season:fall, year:1842".

The "src=" element may be referenced as, e.g., http://ow.com/s.png.

Individuals and entities are referenced in the conventional PIDF-LO format by a universal resource indicator (URI), e.g., "pres:mike@samplecarrier.com". As modified herein to associate location to Internet based content, words are included within the content to indicate an active reference to the relevant content subject. These words may be inserted, e.g., in the <meta name "keywords"> section of an HTML document.

Location may be associated to Internet based XML content using an XML based structure either (a) using Simple Object Access Protocol (SOAP); or (b) using Session Initiation Protocol (SIP).

Exemplary specific location aware ("Location") content tags include, e.g., a specific location identified by latitude and longitude (lat/lon); or a specifically defined zone.

A location zone may be defined, e.g., using a coordinate based polygon system. A suitable coordinate based polygon is disclosed and described in co-owned and co-pending U.S.

patent application Ser. No. 11/442,254, filed May 30, 2006, entitled "Voice Over Internet Protocol (VoIP) E911 Metro Street Address Guide (MSAG) Validation"; which claims priority from 60/685,075, filed May 27, 2005, entitled "Voice Over Internet Protocol (VoIP) E911 Metro Street Address Guide (MSAG) Challenges", by Timothy J. Lorello, the entirety of both of which are expressly incorporated herein by reference.

A coordinate based polygon system defining location zone may have an assigned numbering system. For example, the assigned number "1.0.0.0" may be used to indicate a four (4) square kilometer (Km) area with an assigned centroid lat/lon; the assigned number "1.1.0.0" may be used to indicate a two (2) square Km area with an assigned centroid lat/lon; the assigned number "1.1.1.0" may be used to indicate a one (1) square Km area with an assigned centroid lat/lon; and the assigned number "1.1.1.1" may be used to indicate a one-half (0.5) square Km area with an assigned centroid lat/lon.

Location may be defined directionally, e.g., as "north", "south", "east", "west", etc.

In accordance with another aspect of the invention, XML content (e.g., photos on the Internet) can be provided with descriptive information using location aware content tags included in the presence information of a PIDF-LO document. Exemplary location aware content tags include, e.g., "Time Reference", "Weather Reference", and/or "Descriptive Reference" tags.

Regarding various content types, several protocols allow the use of data representing different 'media' such as text, images, audio, and video, and within such media different encoding styles, such as (in video) JPEG, GIF, IEF, and TIFF. The Multimedia Internet Message Extensions (MIME) protocol defines several initial types of multimedia data objects, and a procedure for registering additional types with the Internet Assigned Numbers Authority (IANA): text, images, audio and video.

FIG. 1 shows relevant elements associating MIME type content on the Internet to a geographic location while also correlating other descriptive indexing terms within a modified standards based XML based PIDF-LO structure as defined by the Internet Engineering Task Force (IETF), for use with standardized Internet protocols such as IP, SIP and SOAP, in accordance with the principles of the present invention. In particular, FIG. 1 shows elements in a given network relevant to associating location to XML content in an Internet network. Content 100 on a relevant network server is associated with location by network elements, including a user agent 101, an application server 102, a content proxy 104, a presence server 105, a profile database 103, a geographic information server (GIS) server 106, a user plane server 107, a global positioning satellite (GPS) 108, and a menu of locations 109.

Figure 2:
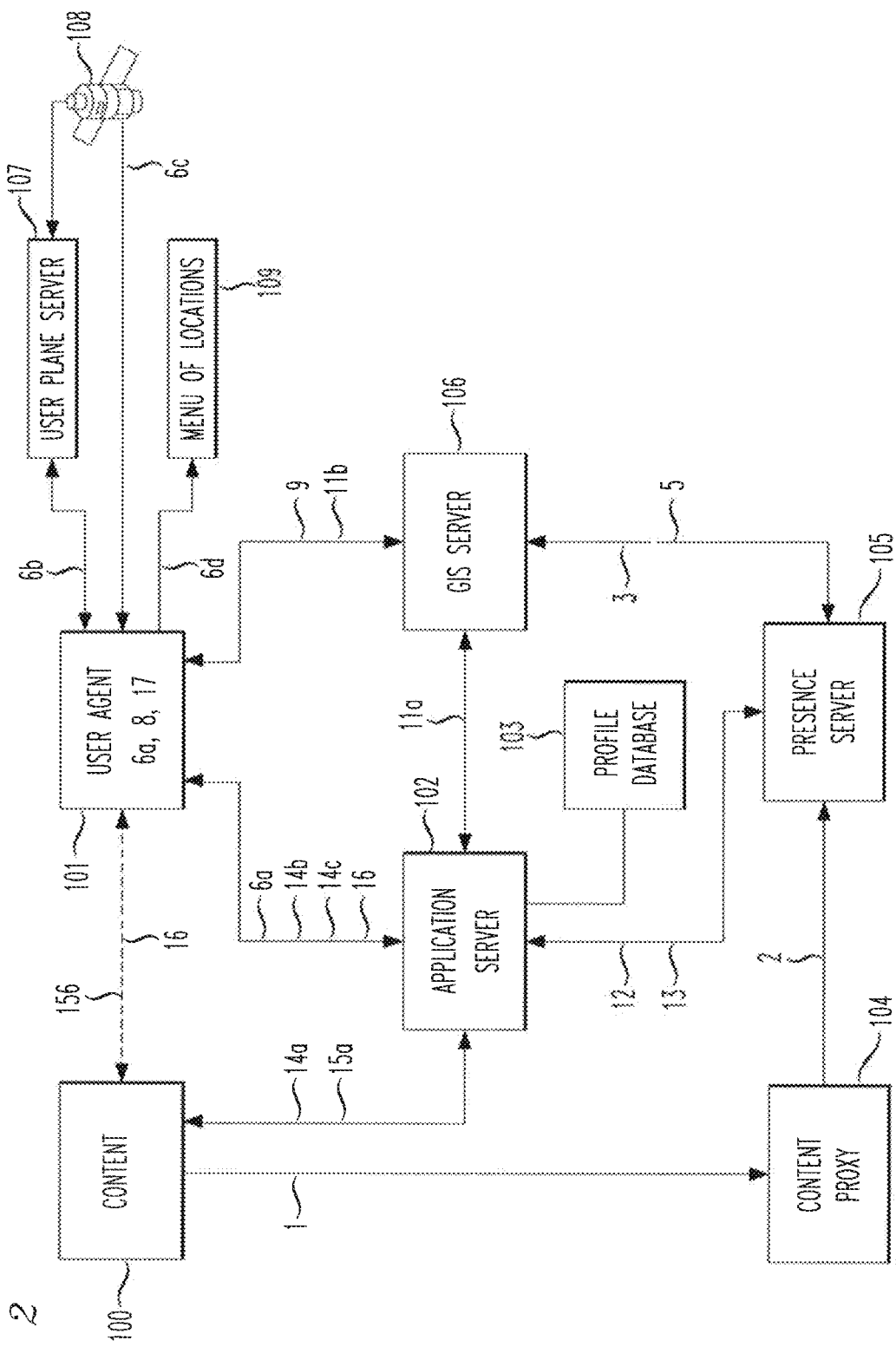
FIGS. 2 and 3 show message flow between the relevant elements associating MIME type content on the Internet to a geographic location, as shown in FIG. 1.
Figure 3:
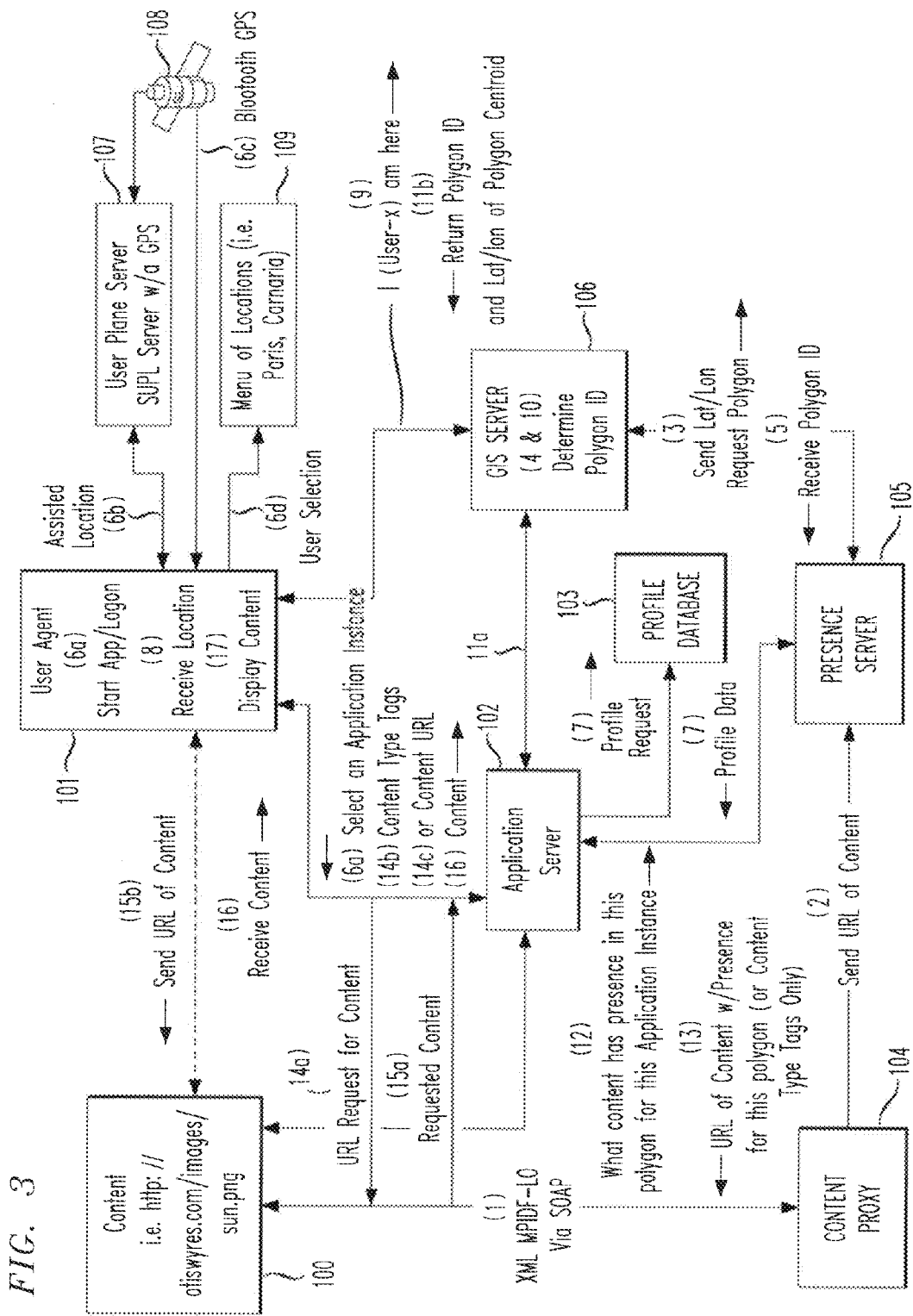
Figure 6:
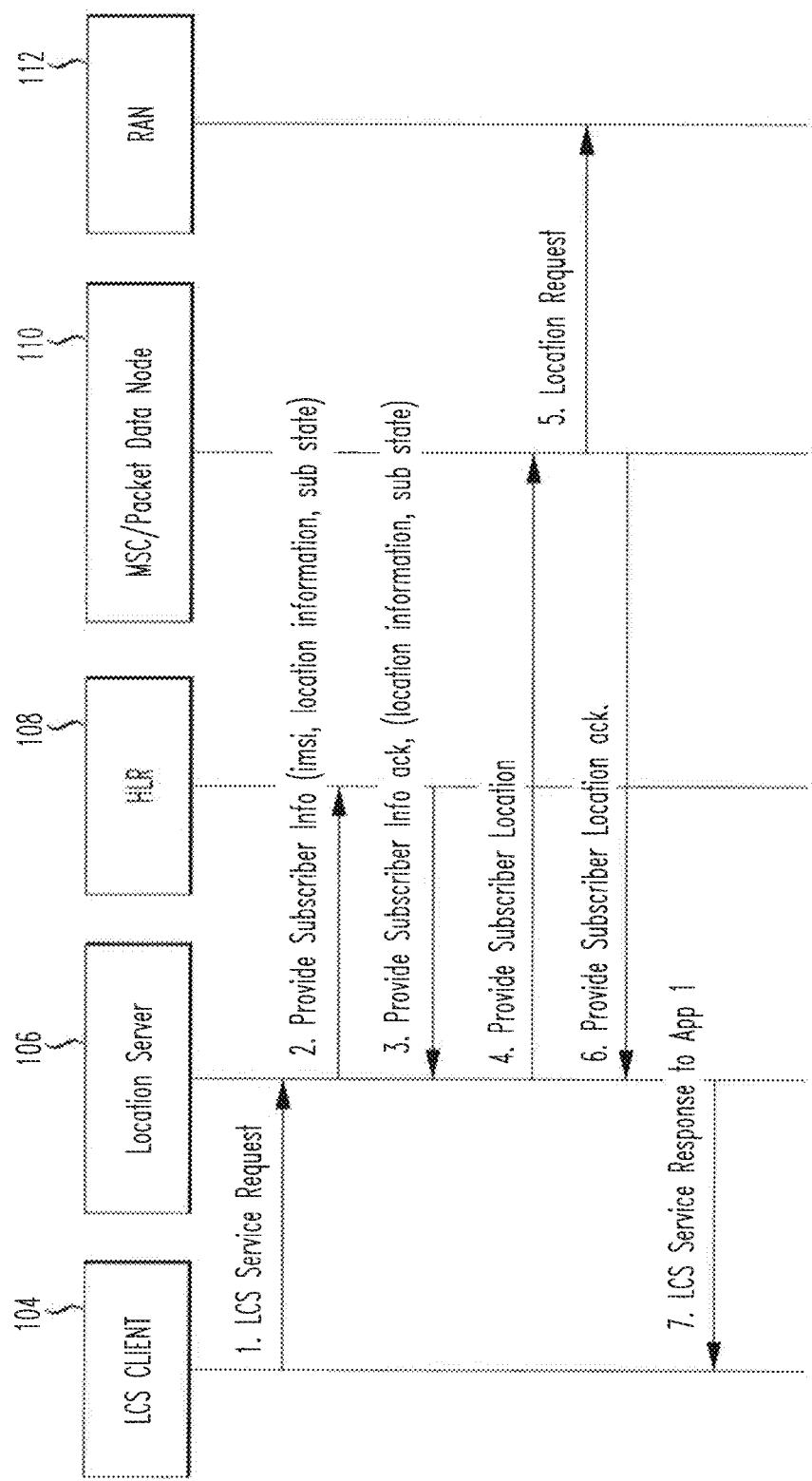
FIG. 6 shows a conventional LoCation Services (LCS) request.

FIGS. 2 and 3 show message flow between the relevant elements associating MIME type content on the Internet to a geographic location, as shown in FIG. 1.

In particular, in step 1 of FIGS. 2 and 3, content 100 is sent to the content proxy 104 using an XML/SOAP interface. The content 100 may be, for the sake of example, "http://otiswyres.com/images/sun.png". The transaction uses an XML based Modified Presence Information Data Format-Location Object (MPIDF-LO) as described herein.

In step 2, the content proxy 104 passes the universal resource locator (URL) of the content 100 to the presence server 105. The presence server 105 establishes a record of the content 100 and all associated tags.

In step 3, the presence server 105 sends a lat/lon or polygon "Request" to the GIS server 106. The lat/lon relates to a location of the content 100.

In step 4, the GIS server 106 determines the polygon ID associated with the provided lat/lon of the content 100.

In step 5, the GIS server 106 returns back the determined polygon ID.

In step 6a, the user starts up a main application on the user agent 101, selects an instance to run, and (as shown in steps 6b-6d) the Location type, and passes relevant logon information to the application server 102.

In step 6b, the assisted global positioning system "aGPS" and a user plane server 107 (e.g., a SUPL server with aGPS) in a carrier network provide location. Alternatively, as shown in step 6c, a BLUETOOTH™ GPS 108 may provide location. Another alternative, shown in step 6d, allows the user to select a location from a menu of locations, e.g., "Paris", "Camaria", etc. 109.

In step 7, the application server 102 looks up the user profile for the application instance, and completes the logon process. Profile data is passed from the profile database 103 back to the application server 102.

In step 8, the user agent 6a receives location from the source (step 6b, 6c or 6d).

In step 9, the user agent 101 sends its location to the GIS server 106, e.g., "user 'X' indicates that 'I am here'".

In step 10, the GIS server 106 identifies the polygon within which the user agent 101 is currently located.

In step 11a, the GIS server 106 passes the identified polygon ID to the application server 102, e.g., "user 'X' is in this polygon at this absolute position".

In step 11b, the GIS server 106 returns the identified polygon ID and lat/lon of the polygon centroid to the user agent to the application on the user agent 101.

In step 12, the application server 102 requests identification of what content has presence in the identified polygon for this application instance. For example, a list of content with presence in this polygon may be provided, for this application instance, and within the relevant user profile.

In step 13, the presence server 105 returns to the application server 102 a list of content (or content tags) relevant to the user profile, this application instance, and this polygon ID, e.g., the URL of content with presence for this polygon [or content type tags only].

In step 14a, the application server 102 uses the URL for each element in the list of content and sends a URL request (e.g., hyper-text transfer protocol (HTTP)) to the relevant content 100. Or, as shown in step 14b, the application server 102 requests content type tags from the user agent 101. Or, as shown in step 14c, the application server 102 requests from the user agent 101 the identity or URL of content.

In step 15a, the requested content is returned to the application server 102, or the content URL from step 14c is relayed from the application.

In step 15b, the user agent 101 requests the content for each element, e.g., via Hyper Text Transfer Protocol (HTTP) and the URL of requested content.

In step 16, the content is returned to the application on the user agent 101 directly from the content source 100, or from the application server 102.

In step 17, the application on the user agent 101 displays or otherwise utilizes the received content.

FIG. 4 shows exemplary presence lists for a Modified Presence Information Data Format-Location Object (Modified PIDF-LO) document for use in tying MIME type logical content to a geospacial location, and for tagging the content with descriptive information relating to the content, in accordance with the principles of the present invention.

In particular, as shown in FIG. 4, an otherwise conventional PIDF-LO format is modified to use the "entity=", "name=", and "src=" lists in the presence section of a modified PIDF-LO format to identify XML content. In this particular example, the XML content is identified as:

entity="pres:http://otiswyres.com/images/SunfromPlane.png"
src="http://otiswyres.com/images/SunfromPlane.png"

and within the first tuple is:

srsName="http://www.opengis.net/gml/srs/epsg.xml#4326"

Note also in FIG. 4 the addition of descriptive tags to XML content. Predefined tags in this example are "weather", "century", "season" and "year".

name="weather:hurricane season, century: 1800, season: fall, year: 1842"

Thus, the location aware content defined by the "entity=" list in the presence section of the MPIDF-LO document is further modified with a description of hurricane season, 1800 century, fall season, and 1842.

FIG. 5 shows exemplary presence lists for a location aware content-Modified Presence Information Data Format-Location Object (Modified PIDF-LO) for use in tying MIME type logical content to a geospacial location, and for tagging the content with descriptive information relating to the content, in accordance with the principles of the present invention.

In particular, as shown in FIG. 5, an otherwise conventional PIDF-LO format is modified to use the "entity=", "name=", and "src=" lists in the presence section of a modified PIDF-LO format to identify XML content. In this particular example, the XML content is identified as:

entity=&Itimg
src=http://otiswyres.com/images/SunfromPlane.png
name="Sun from Plane"

and within the first tuple is:

srsName="http://www.opengis.net/gml/srs/epsg.xml#4326"

Note also in FIG. 5 the addition of descriptive tags to XML content. As in the example of FIG. 4, Predefined tags in the example of FIG. 5 are "weather", "century", "season" and "year".

tag:weather="hurricane"
tag:century="1800"
tag:season="fall"
tag:year="1842"

Thus, the location aware content defined by the "entity=" list in the presence section of the MPIDF-LO document is further modified with a description of hurricane, 1800 century, fall season, and 1842.

While the invention has been described with reference to the exemplary embodiments thereof, those skilled in the art will be able to make various modifications to the described embodiments of the invention without departing from the true spirit and scope of the invention.

What is claimed is:

1. A method of associating Multimedia Internet Message Extensions (MIME) content to a geographic location, comprising:
   receiving at a physical presence server, from a physical content proxy server, a universal resource locator (URL) of MIME content;
   transmitting, from said physical presence server to a physical GIS server, a latitude/longitude (lat/lon) associated with said MIME content;
   receiving back in response from said physical GIS server a first polygon ID associated with said lat/lon of said MIME content;
   receiving, at said physical GIS server, a current location of a given wireless device;
   transmitting, from said physical GIS server to a physical application server, a second polygon ID associated with said current location of said given wireless device;
   receiving, from said physical application server, a request message for identification of MIME content having presence in said second polygon ID;
   inserting, at said physical application server, said URL of said MIME content relevant to said second polygon ID into a Presence Information Data Format-Location Object (PIDF-LO) file that lacks geospatial location information identifying a specific physical zone.

2. The method of associating Multimedia Internet Message Extensions (MIME) content to a geographic location according to claim 1, wherein:
   said URL of said MIME content is inserted in an "entity=" list in a <presence . . . >section of said PIDF-LO file.

3. The method of associating Multimedia Internet Message Extensions (MIME) content to a geographic location according to claim 2, wherein:
   said URL of said MIME content is also inserted in a "src=" list in said <presence . . . >section of said PIDF-LO file.

4. The method of associating Multimedia Internet Message Extensions (MIME) content to a geographic location according to claim 1, wherein:
   said URL of said MIME content is inserted in a "name=" list in a <presence . . . >section of said PIDF-LO file.

5. The method of associating Multimedia Internet Message Extensions (MIME) content to a geographic location according to claim 1, wherein:
   said geospatial location information is defined using a coordinate based polygon system.

6. The method of associating Multimedia Internet Message Extensions (MIME) content to a geographic location according to claim 5, wherein:
   said coordinate based polygon system is defined using an assigned numbering system.

7. The method of associating Multimedia Internet Message Extensions (MIME) content to a geographic location according to claim 1, wherein:
   said geospatial location information identifies a specific latitude/longitude.

8. The method of associating Multimedia Internet Message Extensions (MIME) content to a geographic location according to claim 1, wherein:
   said geospatial location information is defined directionally.

9. The method of associating Multimedia Internet Message Extensions (MIME) content to a geographic location according to claim 1, wherein:
   said MIME content comprises text.

10. The method of associating Multimedia Internet Message Extensions (MIME) content to a geographic location according to claim 1, wherein:
    said MIME content comprises images.

11. The method of associating Multimedia Internet Message Extensions (MIME) content to a geographic location according to claim 1, wherein:
    said MIME content comprises audio.

12. The method of associating Multimedia Internet Message Extensions (MIME) content to a geographic location according to claim 1, wherein:
    said MIME content comprises video.

13. The method of associating Multimedia Internet Message Extensions (MIME) content to a geographic location according to claim 1, wherein:
    said MIME content is Multimedia Internet Message Extensions (MIME) type content.

14. The method of associating Multimedia Internet Message Extensions (MIME) content to a geographic location according to claim 1, further comprising:
tagging descriptive information relating to location aware XML content in a <presence . . . >section of said PIDF-LO file.

15. The method of associating Multimedia Internet Message Extensions (MIME) content to a geographic location according to claim 14, wherein:
said tagged descriptive information is included in said <presence . . . >section of said PIDF-LO file.

16. The method of associating Multimedia Internet Message Extensions (MIME) content to a geographic location according to claim 14, wherein:
said tagged descriptive information includes at least one of: "weather", "century", "season", and "year" tags.

17. The method of associating Multimedia Internet Message Extensions (MIME) content to a geographic location according to claim 14, wherein:
said tagged descriptive information includes at least one of: "Time Reference", "Weather Reference", and "Descriptive Reference" tags.

18. The method of associating Multimedia Internet Message Extensions (MIME) content to a geographic location according to claim 1, wherein:
said URL of said MIME content inserted into said PIDF-LO file is additionally relevant to a user profile associated with said given wireless device.

19. A method of associating XML content to a geographic location, comprising:
receiving at a physical presence server, from a physical content proxy server, a universal resource locator (URL) of Extensible Markup Language (XML) content;
transmitting, from said physical presence server to a physical GIS server, a latitude/longitude (lat/lon) associated with said XML content;
receiving back in response from said physical GIS server a first polygon ID associated with said lat/lon of said XML content;
receiving, at said physical GIS server, a current location of a given wireless device;
transmitting, from said physical GIS server to a physical application server, a second polygon ID associated with said current location of said given wireless device;
receiving, from said physical application server, a request message for identification of MIME content having presence in said second polygon ID;
inserting, at said physical application server, said URL of said XML content relevant to said second polygon ID into a Presence Information Data Format-Location Object (PIDF-LO) file that lacks geospatial location information identifying a specific physical zone.

20. The method of associating XML content to a geographic location according to claim 19, wherein:
said URL of said XML content is inserted in an "entity=" list in a <presence . . . >section of said PIDF-LO file.

21. The method of associating XML content to a geographic location according to claim 20, wherein:
said URL of said XML content is also inserted in a "src=" list in said <presence . . . >section of said PIDF-LO file.

22. The method of associating XML content to a geographic location according to claim 19, wherein:
said URL of said MIME content is inserted in a "name=" list in a <presence . . . >section of said PIDF-LO file.

23. The method of associating XML content to a geographic location according to claim 19, wherein:
said URL of said XML content inserted into said PIDF-LO file is additionally relevant to a user profile associated with said given wireless device.

* * * * *